(12) United States Patent
Elliott et al.

(10) Patent No.: US 6,650,742 B1
(45) Date of Patent: Nov. 18, 2003

(54) SYSTEMS AND METHODS FOR REDUCING THE OCCURRENCE OF ANNOYING VOICE CALLS

(75) Inventors: Brig Barnum Elliott, Arlington, MA (US); David Spencer Pearson, Bennington, VT (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/575,102

(22) Filed: May 19, 2000

(51) Int. Cl.[7] .............................................. H04M 15/00
(52) U.S. Cl. ............................. 379/114.22; 379/114.05; 379/121.02
(58) Field of Search ....................... 379/121.01, 121.02, 379/126, 127.03, 114.22, 114.01, 114.05, 114.1, 114.23; 455/414, 406, 407, 408

(56) References Cited

U.S. PATENT DOCUMENTS

| | | | |
|---|---|---|---|
| 5,771,281 A | * | 6/1998 | Batten, Jr. ............... 379/93.23 |
| 5,943,409 A | | 8/1999 | Malik .......................... 379/209 |
| 6,041,112 A | | 3/2000 | Malik .......................... 379/209 |
| 6,061,443 A | * | 5/2000 | Yablon .................... 379/355.08 |
| 6,259,779 B1 | * | 7/2001 | Council et al. |
| 6,353,663 B1 | * | 3/2002 | Stevens et al. |
| 6,535,592 B1 | * | 3/2003 | Snelgrove ............... 379/114.07 |

* cited by examiner

Primary Examiner—Curtis Kuntz
Assistant Examiner—Barry W Taylor
(74) Attorney, Agent, or Firm—Leonard Charles Suchyta; James K. Weixel

(57) ABSTRACT

A system penalizes callers for annoying voice calls. The system identifies a caller (540) associated with a call to a called party in response to invocation of a feature activation code by the called party. The system records the occurrence of the feature activation code invocation (550) and notifies a billing entity (560) of the identity of the caller and the invocation of the feature activation code so that the billing entity can charge the caller for the call to the called party.

20 Claims, 5 Drawing Sheets

| SUBSCRIBER ID 310 | SUBSCRIBER SERVICES 320 | | |
|---|---|---|---|
| | CALLER ID 330 | TIME/DATE 340 | FLAG 350 |

300

FIG. 3

SYSTEMS AND METHODS FOR REDUCING THE OCCURRENCE OF ANNOYING VOICE CALLS

BACKGROUND OF THE INVENTION

A. Field of the Invention

The present invention relates generally to telephone systems and, more particularly, to systems and methods for reducing the number of annoying voice calls, such as telemarketing calls, received by a particular party.

B. Description of Related Art

Annoying telephone calls, such as telemarketing calls, have increased exponentially over the last several years. Many people targeted by telemarketers do not desire to receive or answer the telemarketing calls. Several conventional methods exist to help people avoid these annoying voice calls.

One such conventional method requires a called party to purchase a caller identification (ID) device that captures the identification or telephone number of a calling party and displays it for the called party when the call arrives. In this way, the called party may avoid voice calls from parties or telephone numbers that the called party does not recognize. This method has a few disadvantages, however. First, the called party must purchase a caller ID device and pay for the caller ID service with the local telephone company. Also, some telephone numbers are blocked or otherwise cannot be identified by the caller ID device.

Another conventional method for preventing telemarketing calls requires a called party to have his telephone number removed from the dialing list of the telemarketer. This method, however, involves effort and is only partially effective because new calling lists are constantly being generated. The called party in this case would have to constantly act to remove his telephone number from these new lists.

A further method requires the called party to take his telephone off the hook to avoid telemarketing calls. This method is undesirable because it also blocks calls that the called party wants to receive. This method also causes the telephone to emit a loud off-hook warning signal that may annoy the owner of the telephone. Instead of leaving the telephone off the hook, a called party may use an answering machine to screen calls. This method is also undesirable because some people do not leave messages.

As a result, a need exists for a system and method that help reduce the number of annoying voice calls received by a called party.

SUMMARY OF THE INVENTION

Systems and methods consistent with the present invention address this need by providing a caller penalizing service invoked by a called party to penalize a caller for an annoying voice call.

In accordance with the purpose of the invention as embodied and broadly described herein, a system penalizes callers for annoying voice calls. The system identifies a caller associated with a call to a called party in response to invocation of a feature activation code by the called party. The system records the occurrence of the feature activation code invocation and notifies a billing entity of the identity of the caller and the invocation of the feature activation code so that the billing entity can charge the caller for the call to the called party.

In another implementation consistent with the present invention, a method provides a caller penalizing service. The method includes detecting invocation of the caller penalizing service by a called party for a call from a caller to the called party; charging the caller a first fee for the call; and charging the called party a second fee for invocation of the caller penalizing service.

BRIEF DESCRIPTION OF THE DRAWINGS

The accompanying drawings, which are incorporated in and constitute a part of this specification, illustrate the invention and, together with the description, explain the invention. In the drawings.

FIG. 3 is an exemplary diagram of a subscriber database record in the subscriber databases of FIG. 2;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a mechanism by which called parties can strike back against annoying voice calls. Through the use of a caller penalizing service, called parties can impose a fine on callers for their annoying calls. For example, once a called party hangs up from an annoying voice call, the called party may enter a feature activation code, such as *88. In response to the feature activation code, the telephone company fines the caller that placed the annoying voice call. To avoid abuse, the telephone company may also bill the called party for use of the caller penalizing service.

Exemplary Network

Figure 1:
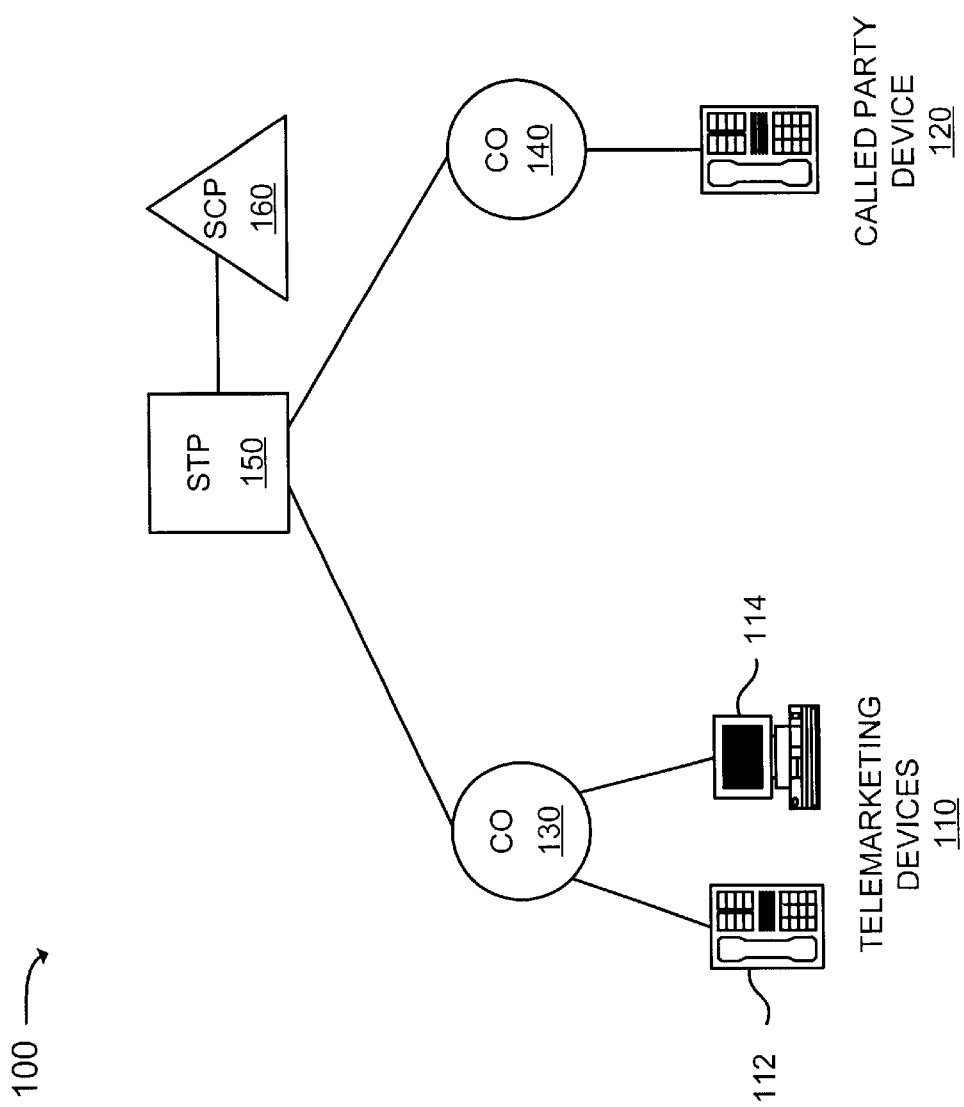
FIG. 1 is a diagram of an exemplary network in which systems and methods consistent with the present invention may be implemented.

FIG. 1 is a diagram of an exemplary network 100 in which systems and methods consistent with the present invention may be implemented. The network 100 may include telemarketing devices 110, called party device 120, central offices (CO) 130 and 140, a signal transfer point (STP) 150, and a service control point (SCP) 160. All of the network elements (i.e., COs, STP, SCP) may operate pursuant to a signaling protocol, such as the Signaling System 7 (SS7) protocol.

The telemarketing devices 110 include devices used by telemarketers to make telemarketing voice calls, such as telephone 112 and/or computer 114. One skilled in the art would recognize that other devices could also be used. The telephone 112 may include one or more conventional telephone devices, such as standard wired or wireless telephones. The computer 114 may include one or more conventional computer devices, such as a personal computer, a personal digital assistant (PDA), etc. The called party device 120 includes one or more devices used by a called party to receive voice calls, such as conventional wired and/or wireless telephones, computer devices, PDAs, etc. Two telemarketing devices 110 and a single called party device 120 have been shown in FIG. 1 for simplicity. In practice, the network 100 may include more of these devices.

The telemarketing and called party devices 110 and 120 may connect to the COs 130 and 140, respectively, via conventional wired, wireless, or optical connections. The COs 130 and 140 may include a service switching point (SSP) switch that includes intelligent network functionality for processing voice calls. For example, when an SSP detects a predetermined set of conditions, the SSP may initiate a trigger and generate a network packet that it sends out on the telecommunications network 100. The SSP suspends call processing until it receives a reply from the network 100 instructing it to take certain action with regard to the call.

The COs 130 and 140 connect to the STP 150 via conventional mechanisms. While FIG. 1 shows the COs 130 and 140 connected to the STP 150 via direct connections, these connections may be via one or more intermediary devices and/or networks. The STP 150 may include a multi-port high speed packet switch that is programmed to respond to routing information to route a packet to its intended destination. The STP 150 is not normally the destination of a packet, but merely directs traffic among the other entities in the network 100 that generate and respond to the packets.

Figure 2:
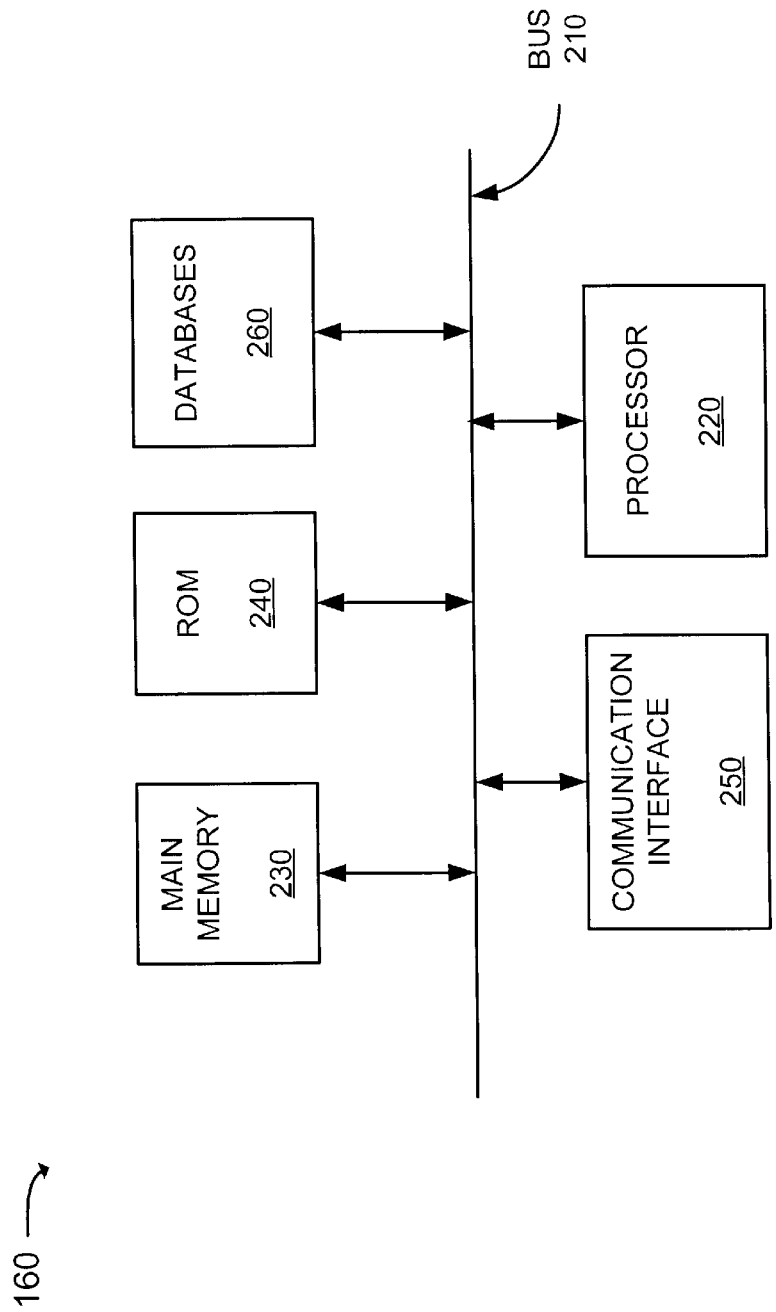
FIG. 2 is a detailed diagram of a service control point (SCP) in the network of FIG. 1.

The STP 150 connects to the SCP 160 via a conventional communication link, such as an Ethernet connection. The SCP 160 provides enhanced telecommunications services for the network 100. FIG. 2 is an exemplary diagram of the SCP 160 in an implementation consistent with the present invention. The SCP 160 may include a bus 210, a processor 220, a main memory 230, a read only memory (ROM) 240, a communication interface 250, and one or more databases 260. The bus 210 permits communication among the components of the SCP 160.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The communication interface 250 may include any transceiver-like mechanism that enables the SCP 160 to communicate with the STP 150.

The databases 260 may include a computer-readable medium (i.e., one or more memory devices and/or carrier waves) that stores network and subscriber information. The databases 260 may include separate databases for the network and subscriber information. The network database may store information regarding the provision of enhanced telecommunications services in the network 100. The subscriber database may store information regarding particular subscribers and services to be accorded to these subscribers.

FIG. 3 is an exemplary diagram of a subscriber record 300 that may be stored in the subscriber database. The record 300 may include several fields, including subscriber identifier (ID) field 310, subscriber services field 320, caller ID field 330, time/date field 340, and flag field 350. One skilled in the art would recognize that the record 300 may be configured to include more or less fields than illustrated in FIG. 3.

The subscriber ID field 310 may store information that identifies a particular subscriber. The subscriber services field 320 may store information regarding particular services to which the subscriber has subscribed. Typically, the subscriber must contact a local telephone company to acquire these services and pay for them, usually on a monthly or per-use basis. Assume, for example, that one of these services includes a caller penalizing service, consistent with the present invention, for reducing the number of annoying voice calls the subscriber receives. As will be described, the caller penalizing service permits the subscriber to penalize a caller, in a monetary sense, for an annoying voice call.

The caller ID field 330 may store information that identifies a directory number corresponding to a voice call received by the subscriber. The time/date field 340 may store information that identifies the time and date upon which the call identified in the caller ID field 330 occurred. The flag field 350 may store one or more bits that indicate that the subscriber wishes to invoke the caller penalizing service for the call identified by the caller ID field 330.

In some implementations consistent with the present invention, the record 300 includes multiple entries of the caller ID field 330, time/date field 340, and flag field 350. These multiple entries correspond to multiple, separate voice calls to the subscriber.

Exemplary Incoming Call Processing

Figure 4:
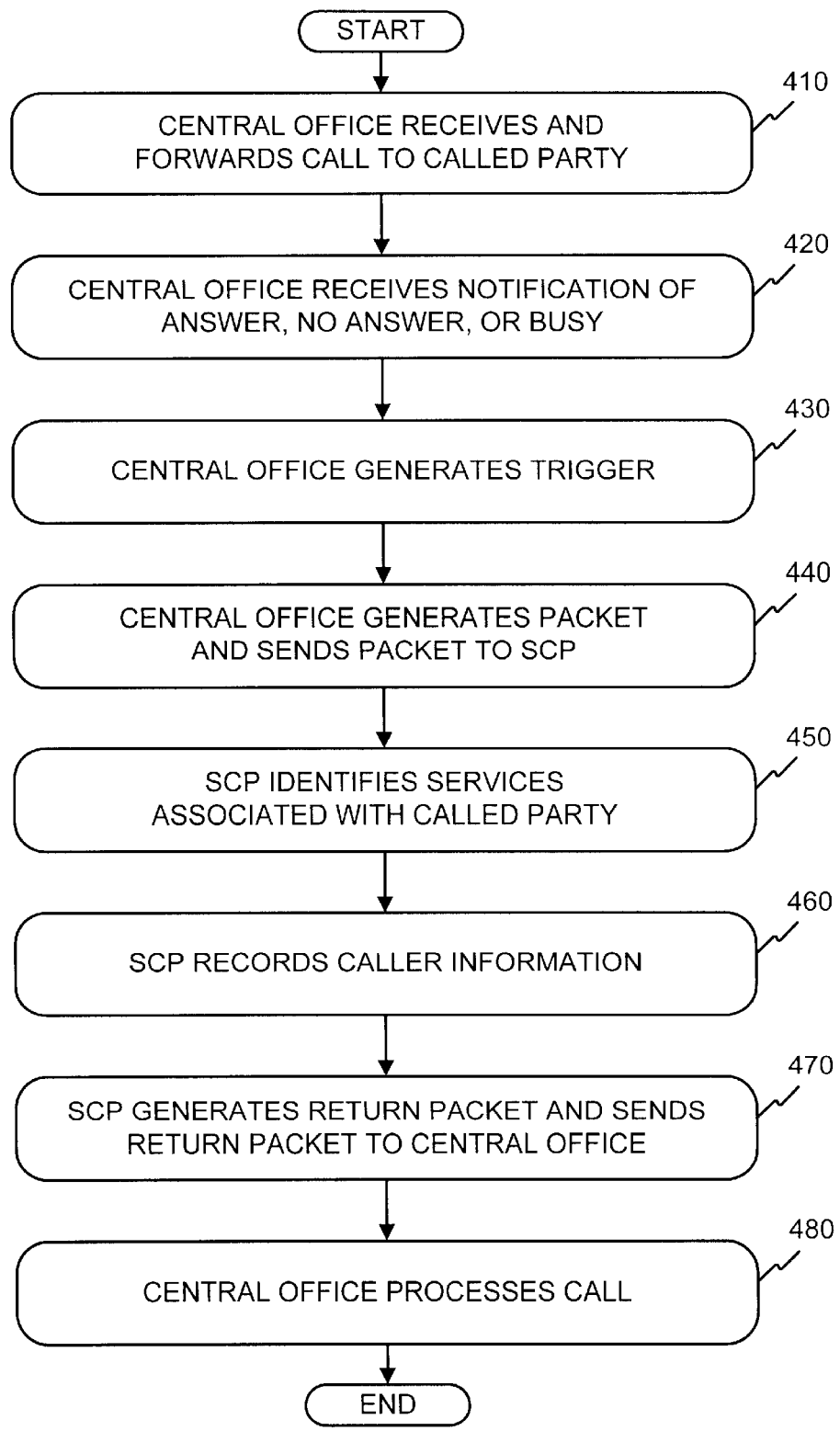
FIG. 4 is a flowchart of processing for an incoming voice call in accordance with an implementation consistent with the present invention.

FIG. 4 is an exemplary flowchart of processing for a call routed through the network 100. For the following description, assume that a telemarketer, using one of the telemarketing devices 110 of FIG. 1, places a voice call to a called party device 120. To place the call, the telemarketer may dial a directory number associated with the called party. The CO 130 receives the call and routes it in a conventional manner through the network 100 to the CO 140 serving the called party device 120.

The CO 140 receives the call and forwards it to the called party device 120 using the directory number of the called party [step 410]. Once the call reaches the called party device 120, one of at least three things can occur. First, the called party may answer the call. Second, the call may go unanswered. Third, the call may reach a busy signal because the called party is currently on another call. In each of these circumstances, the network 100 generates distinct signals reflecting the circumstance in a conventional manner and notifies the CO 140 [step 420].

In response to the notification, the CO 140 generates a trigger, such as a termination attempt trigger (TAT), in association with the call forwarding attempt to the called party device 120 [step 430]. The trigger generation causes the CO 140 to generate a packet with information regarding the call. The CO 140 generates the packet and sends it to the SCP 160 [step 440]. The SCP 160, using the information contained in the packet, identifies the services associated with the called party [step 450]. The SCP 160 may do this by analyzing the records in its subscriber database.

If the called party is a subscriber to an enhanced telecommunication service, the SCP 160 extracts information from the received packet and stores it in the subscriber database [step 460]. For example, if the called party is a subscriber to an automatic recall service (i.e., *69) or a caller penalizing service consistent with the present invention, the SCP 160 may store information, such as the caller ID, time, and date, corresponding to the call in a subscriber database record.

The SCP 160 then generates a return packet and sends it to the CO 140 [step 470]. The return packet may include instructions for the CO 140 for further processing of the call.

For example, the return packet may instruct the CO 140 to terminate the call if the call went unanswered. The CO 140 processes the call in accordance with the instructions in the return packet [step 480].

Exemplary Caller Penalizing Service Processing

Figure 5:
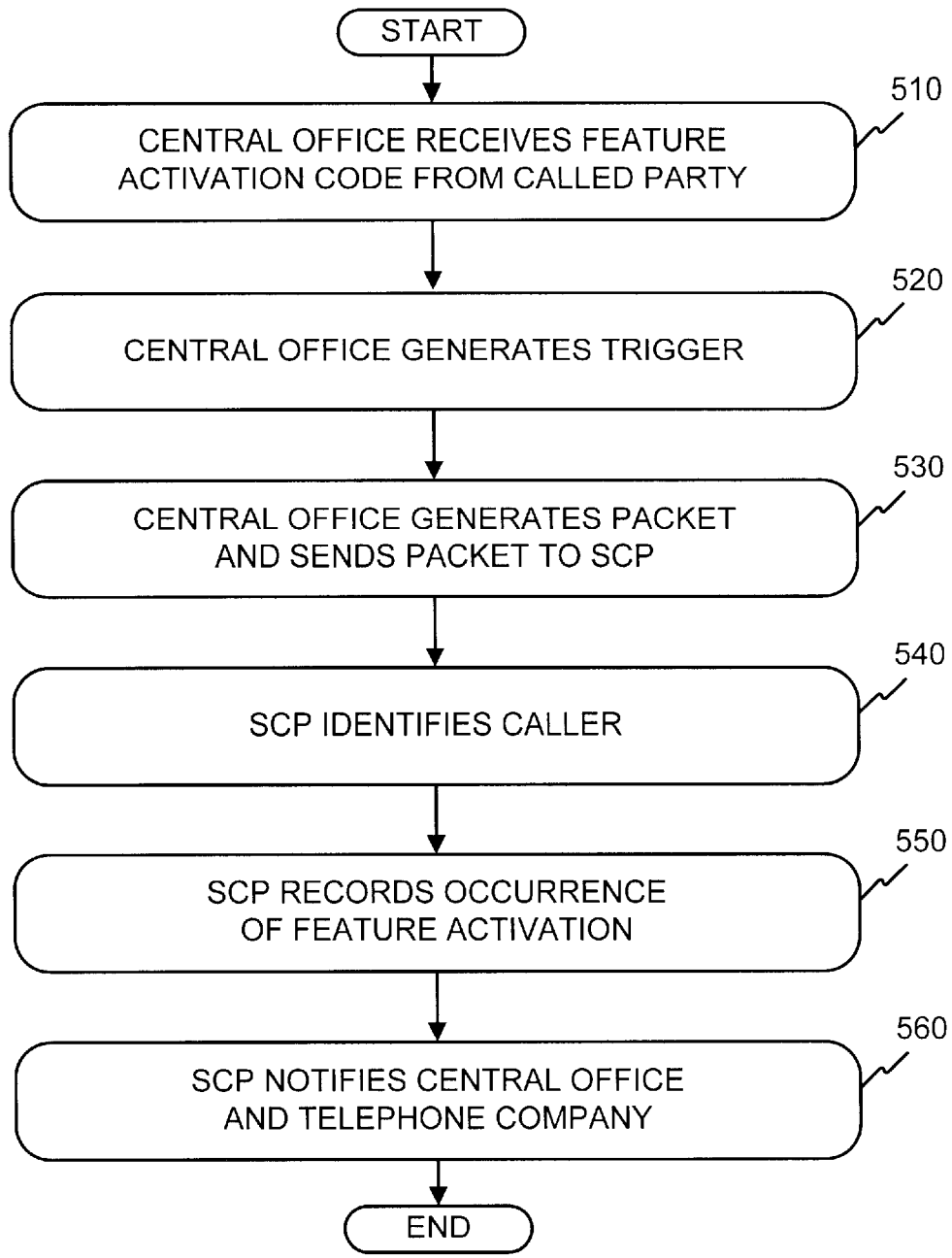
FIG. 5 is a flowchart of processing for penalizing a caller in accordance with an implementation consistent with the present invention.

FIG. 5 is a flowchart of processing for penalizing a caller in accordance with an implementation consistent with the present invention. In the following description, assume that the called party answered the voice call in the last example and wishes to activate the caller penalizing service consistent with the present invention. In this case, the called party disconnects the call using the called party device 120. The called party then enters a feature activation code, such as *88, corresponding to the caller penalizing service using the called party device 120.

The CO 140 receives the feature activation code from the called party device 120 [step 510] and generates a trigger [step 520]. In response to the trigger, the CO 140 generates a packet that queries the SCP 160 to determine whether the SCP 160 has information regarding the last call to the called party, and sends the packet to the SCP 160 [step 530]. Using information from the packet, the SCP 160 accesses the subscriber database to identify the last caller [step 540]. For example, the SCP 160 may use information regarding the called party (i.e., the subscriber ID) as an index into the subscriber database to locate the correct subscriber record.

The SCP 160 then records the occurrence of the feature activation code [step 550]. For example, the SCP 160 may set the flag in the flag field of the subscriber record corresponding to the last caller. At this point, the SCP 160 notifies the CO 140 that the caller penalizing service has been activated via a return packet [step 560]. The SCP 160 may also immediately notify a billing entity, such as a local telephone company, of the fine to be imposed on the calling party [step 560]. Alternatively, the SCP 160 may notify the telephone company at periodic periods. In this case, the SCP 160 may generate a message regarding several fines, corresponding to several different voice calls, to notify the telephone company.

The telephone company then bills the caller for the previous annoying voice call. In some implementations consistent with the present invention, the telephone company also bills the called party for use of the caller penalizing service. Because this service does not distinguish between telemarketing calls and other types of voice calls, the charges imposed may be small. The small charge may add up to a strong economic incentive for companies that make a very large number of calls, such as telemarketing companies. In one implementation consistent with the present invention, the fine is chosen from a sliding scale of fines for the annoying caller. For instance, if the caller were fined more than 100 times in a day within some area (e.g., an area code), they might have to pay double rates on their fines. If they are fined more than 200 times, they pay triple rates.

The revenue collected from this service may be shared in a manner that encourages both the telephone company and the local regulatory board to provide such a service to consumers. For instance, they could split the total charge.

CONCLUSION

Systems and methods consistent with the present invention provide a service to drastically reduce the number of annoying voice calls that a consumer will receive. This service is extremely cheap and easy to implement as an addition to the existing telephony services architecture.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the network 100 has been described as having an STP 150 and an SCP 160, in other implementations consistent with the present invention the network 100 may be configured differently.

Also, while a database record 300 has been described as having a flag field 350, in other implementations consistent with the present invention, the record 300 may contain no such field. This may occur in circumstances where the SCP 160 informs the telephone company of use of the caller penalizing service upon invocation of the service.

In addition, while the preceding description was described in terms of voice calls, systems and methods consistent with the present invention may be applicable to other types of communication between two parties, such as faxes, emails, etc.

The scope of the invention is defined by the claims and their equivalents.

What is claimed is:

1. A method for penalizing callers for annoying voice calls, comprising:

identifying a caller associated with a call to a called party in response to invocation of a feature activation code by the called party;

recording the invocation of the feature activation code;

notifying a billing entity of the identity of the caller and the invocation of the feature activation code so that the billing entity can charge the caller; and notifying the billing entity of an identity of the called party and the invocation of the feature activation code so that the billing entity can charge the called party.

2. The method of claim 1, wherein the identifying includes:

obtaining caller identification information from the call.

3. The method of claim 1, wherein the recording includes:

storing a flag in a record corresponding to the called party to reflect the invocation of the feature activation code.

4. The method of claim 1, wherein the recording includes:

generating a message regarding the invocation of the feature activation code.

5. The method of claim 1, wherein the notifying includes:

generating a message containing the identity of the caller and reflecting the invocation of the feature activation code, and transmitting the message to the billing entity.

6. A system for penalizing callers for annoying calls, comprising:

means for receiving at least one notification of an invocation of a feature activation code by called parties associated with calls from callers;

means for identifying the callers associated with the calls in response to the notifications; and means for notifying a billing entity of the identities of the callers, identities of the called parties, and the invocations of the feature activation code so that the billing entity can charge the callers and the called parties.

7. A system for penalizing callers for annoying voice calls, comprising:

a memory configured to store a subscriber database having a plurality of subscriber records; and a processor configured to:
- identify a caller associated with a call to a subscriber in response to invocation of a feature activation code by the subscriber,
- record the invocation of the feature activation code in a subscriber record in the subscriber database, and
- notify a billing entity of the identity of the caller, an identity of the subscriber, and the invocation of the feature activation code so that the billing entity can charge the caller and the subscriber.

8. The system of claim 7, wherein the processor is configured to obtain caller identification information from the call.

9. The system of claim 7, wherein the processor is configured to store a flag in the subscriber record to reflect the invocation of the feature activation code.

10. The system of claim 7, wherein the processor is configured to generate a message regarding the invocation of the feature activation code.

11. The system of claim 7, wherein the processor is configured to generate a message containing the identity of the caller and reflecting the invocation of the feature activation code, and transmit the message to the billing entity.

12. The system of claim 7, wherein the billing entity is a telephone company.

13. A computer-readable medium that stores instructions executable by at least one processor to perform a method for penalizing callers for annoying calls, the computer-readable medium comprising:
- instructions for identifying one or more callers associated with calls to called parties in response to invocations of a feature activation code by the called parties;
- instructions for recording the invocations of the feature activation code; and
- instructions for notifying a billing entity of the identities of the callers, identities of the called parties, and the invocations of the feature activation code so that the billing entity can charge the callers and the called parties.

14. A method for providing a caller penalizing service, comprising:
- detecting invocation of the caller penalizing service by a called party for a call from a caller to the called party;
- charging the caller a first fee for the call; and
- charging the called party a second fee for invocation of the caller penalizing service.

15. The method of claim 14, wherein the detecting includes:
- receiving a feature activation code from the called party, the feature activation code invoking the caller penalizing service.

16. The method of claim 14, wherein the charging the caller includes:
- imposing a fine on the caller.

17. The method of claim 16, wherein the imposing includes:
- determining a number of fines previously imposed on the caller, and
- calculating an amount of the fine based on the determined number.

18. The method of claim 14, wherein the charging the called party includes:
- charging the called party the second fee for each invocation of the caller penalizing service.

19. The method of claim 14, wherein the charging the called party includes:
- charging the called party the second fee on a periodic basis for use of the caller penalizing service.

20. The method of claim 14, wherein the second fee is nothing.

* * * * *